Oct. 30, 1962 C. R. HENRY 3,061,541
WATER TREATMENT
Filed Dec. 2, 1957 2 Sheets-Sheet 2

United States Patent Office

3,061,541
Patented Oct. 30, 1962

3,061,541
WATER TREATMENT
Clarence R. Henry, Miami, Fla., assignor to Philadelphia Quartz Company, Philadelphia, Pa., a corporation of Pennsylvania
Filed Dec. 2, 1957, Ser. No. 700,219
1 Claim. (Cl. 210—47)

This invention generally relates to a new method for the treatment of potable waters. More specifically this invention pertains to the process of reacting a soluble sodium silicate and a silicofluoride and in one particular embodiment it relates to the application of this process and its products to the treatment of potable waters in order to clarify, purify, fluoridate, coagulate and remove solid impurities therefrom.

PRIOR ART WATER PURIFICATION

It has long been known that raw waters may be clarified by the addition of various chemical compounds such as aluminum sulfate, ferrous sulfate, ferric sulfate, lime, magnesium sulfate, etc., in amounts varying from a few parts per million to as high as 100 parts per million or even higher. After adding the coagulant the water is agitated for a period varying from minutes to hours in a mixing or coagulation basin. Then, provided that the water has a pH favorable to the particular coagulant used and also provided that the water carries a sufficient concentration of certain dissolved solids to create a favorable condition, there will separate from the water a voluminous floc which entraps the bulk of the suspended solids. The water is then filtered to remove the remaining floc, given any other chemical treatment required, such as chlorination, and pumped into the mains for use.

It is also known that the coagulating action of chemical compounds of the above type may be enhanced by the addition of a coagulant aid such as activated silica sol. In some instances it has also been found feasible to use activated silica sol alone as the coagulant.

ACTIVATED SILICA SOLS

The use of activated silica sols (also often simply referred to as "activated silica") as coagulant aids in solving problems connected with processing raw waters has been expanding steadily during recent years. The most important benefits are that water plant capacities have been increased, faster filtration is obtained, and normal chemical dosages have been so reduced that there is generally a decreased overall cost in the chemical treatment of water.

An activated silica sol is a solution of a soluble silicate in which the alkali has been neutralized and the silica has been permitted to polymerize to only a limited extent. Usually the neutralization is carried out in a more concentrated solution containing up to 5% $SiO_2$. Polymerization may be permitted to continue up to but short of gelation of the solution. Further polymerization is inhibited by dilution, usually in the prior art to less than 0.6% $SiO_2$. This dilution may be accomplished anytime between 10 and 90% of the time elapsing between neutralization and gelation i.e. the sol life or gel time.

It is well established in the art of preparing activated silica sols that soluble silicates ranging from $Na_2O:SiO_2$ to $Na_2O:4SiO_2$ may be used as starting material. The more alkaline silicates merely require more reactant to neutralize the excess alkali.

The concentration of the initial sol before dilution may vary from 0.2 to 5% $SiO_2$. The dosage in the treated water may vary from about 1 p.p.m. to as high as 25 p.p.m. depending on the characteristics of the water being treated. Usually one will use from 2 to 8 p.p.m.

In forming activated silica sols it has been known to use many substances which react with alkali silicates. These include acids (e.g. sulfuric, hydrochloric) and salts of alkali metals (e.g. $NaHSO_4$, $NaHSO_3$, $NaHCO_3$) and salts of heavier metals (e.g. aluminum, iron) which hydrolyze to form acids as well as ammonium compounds and acidic gases such as chlorine or carbon dioxide.

FLUORIDATION

It has long been known that beneficial results could be achieved by treating potable water with between about 0.5 to 1.5 parts per million of fluoride ion. It has been recognized that potable waters carrying less than about 0.5 part per million of fluoride ion do not reduce caries in the population served whereas waters carrying more than about 1.5 parts per million of fluoride ion tend to produce fluorosis and mottling of teeth. This activity is especially noticeable in teeth exposed to fluoride ion during their early formative stages. Where too little fluoride ion is present, it may be supplemented by the addition of soluble salts containing fluoride such as sodium fluoride and the silicofluorides. When too much fluoride ion is present in the original water, it may be removed by treatment with alum with or without the activated silica coagulant aid. The optimum amount of fluoride ion appears to be about 0.7 to 1.2 parts per million.

THE INVENTION BROADLY

In accordance with this invention I have now discovered a process whereby the aforementioned separate coagulation and fluoridation steps may be combined. Very briefly my invention involves the discovery that sodium silicofluoride reacts with sodium silicates to simultaneously form both an activated silica sol and a soluble fluoride ion. The sodium hydroxide (resulting from the hydrolysis of the sodium silicate) reacts with silicofluoride according to the following equation:

$$Na_2SiF_6 + 4NaOH \rightarrow 3Na_2F_2 + 2H_2O + {}^-SiO_2{}^-$$

where $^-SiO_2^-$ represents activated silica.

As applied to the treatment of raw waters, my invention involves introducing an activated silica sol containing fluoride ions into the raw water, the activated silica sol containing fluoride ions being produced by contacting a solution of sodium silicofluoride with sodium silicate while permitting a reaction time ranging from about one minute up to 90% of the gel time of the reaction mixture and thereafter introducing the reaction mixture into the raw water in an amount sufficient to produce floc formation, clarification and fluoridation of the raw water.

The sodium silicate may have a ratio of $Na_2O$ to $SiO_2$ ranging between 2:1 and 1:4 and a concentration in water ranging between 0.2 and 5% $SiO_2$. The sodium silicofluoride may have a concentration (in water) ranging between 0.1 and 0.76% and is preferably a saturated solution.

If it is found that the use of a sodium silicofluoride required to form a sufficient concentration of activated silica provides too high a fluoride ion concentration in the finished water then part of the activation may be carried out with chlorine or some other activating agent. Thus, there is a wide range in the applicability of this invention to the treatment of raw waters for potable purposes.

I have found that the optimum ratio for silica to fluoride is between about 2.5 and about 4.0. For a fluoride feed of one part per million the silica dosage may vary between about 2.5 and 4.0 parts per million.

The prepared activated sol should contain about 0.3% $SiO_2$ or more and should have a pH between about 5.8 and 9.0. Feeding more or less silica usually results in loss of activity as these limits are exceeded. Activation is very rapid being accomplished in less than two minutes when the silica concentration is held above 0.3%. The sols are easy to prepare and control is simple with little equipment being necessary to add silica activation equipment to existing facilities for feeding sodium silicofluoride. The chemical cost is low. It is less than the equivalent amount of sodium silicate being activated. The saving is estimated to be 0.052 dollar per part per million of $SiO_2$ applied at one cent per pound for soluble sodium silicate.

The silica concentration in the activated sol is limited by the ratio of silica to fluoride on the one hand and the solubility of sodium silicofluoride on the other hand to about 2–2.75%. The practical maximum is lowered by the dissolving rate of sodium silicofluoride. The amount of sodium silicofluoride is, of course, limited since the maximum permissible fluoride ion feed is about 1.2 parts per million in the prepared potable water. The average $SiO_2$ feed is 2 to 3 parts per million as a coagulant for lime softened water. Thus, the ratio of $SiO_2/F$ is about 2 to 3 when F is 1.0 part per million and about 4 to 6 when F is 0.5 part per million. Sodium silicofluoride has a solubility at 4° C. of 4.7 grams per liter and at 25° C. it has a solubility of 7.6 grams per liter. Such a saturated solution has a pH of 2.8 and contains 0.46% fluoride ion. The ratio of $SiO_2$ formed by hydrolysis to the original sodium silicofluoride is 0.319 and the ratio of the hydrolyzed silica to F ion is 0.526. In a saturated solution of $Na_2SiF_6$ containing 0.76% of the salt, the $SiO_2$ furnished by its hydrolysis would amount to 0.24%. For a 0.5 p.p.m. feed of fluoride ion and the 4 to 6 $SiO_2/F$ ratio this hydrolytic silica would amount to 8.7 to 12% of the 1.96% and 2.76% $SiO_2$ concentration of the added sodium silicate, and twice as much for a 1.0 p.p.m. fluoride feed.

FIGURE 1 shows the neutralization curve resulting from the titration of one liter of 0.7% sodium silicofluoride with a sodium silicate solution containing 5% $SiO_2$. Some gelling occurred in the pH range of 6–7.

Figure 1:
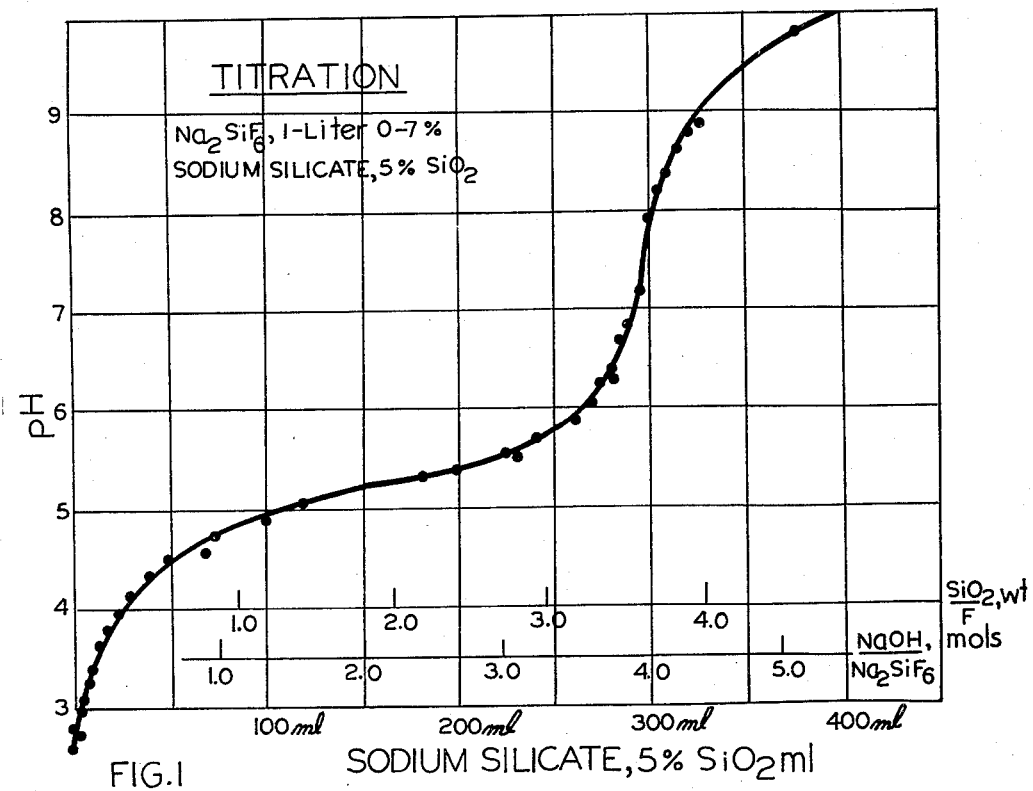
FIGURE 1 is a graph illustrating the neutralization curve of sodium silicate reacted with sodium silicofluoride.
Figure 2:
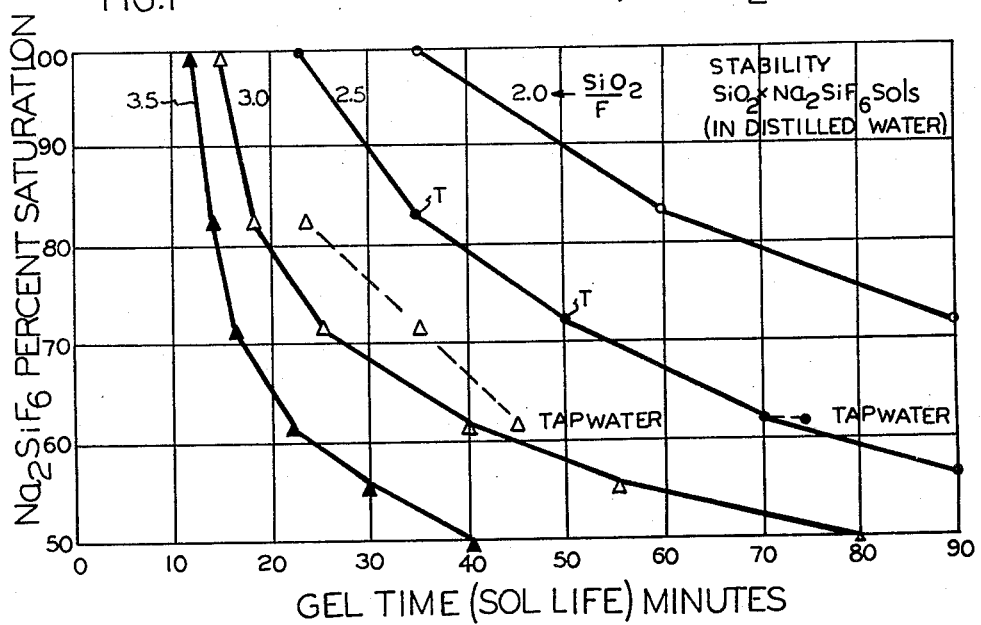
FIGURES 2 and 3 are graphs illustrating the gel time of activated silica with fluoride ion.

FIGURE 2 shows the gel time (or sol life) in minutes for various proportions of activated silica with fluoride ion at several concentrations of $Na_2SiF_6$. Thus, the line for a ratio of 3.0 would also represent a feed of 0.7 p.p.m. of fluoride with 2.1 p.p.m. of $SiO_2$ throughout its length. The 0.7% of $Na_2SiF_6$ would furnish 0.42% of fluoride ion and 0.22% of $SiO_2$ and the added soluble sodium silicate ("N" sodium silicate from the Philadelphia Quartz Company containing 8.9% $Na_2O$ and 28.7% $SiO_2$ and with a mol ratio of $Na_2O:3.3SiO_2$) 1.26% $SiO_2$ to give a total of 1.48% $SiO_2$ in the sol preparation. In the saturated solution the gel time was about 15 minutes using distilled water and 80 minutes at 50% saturation. Using tap water instead of distilled water, that is using a treated lime softened, carbonated well water, the sol life was slightly longer. Ordinarily, an activated silica sol may be used at anytime between 10 and 90% of its gel time or sol life.

Figure 3:
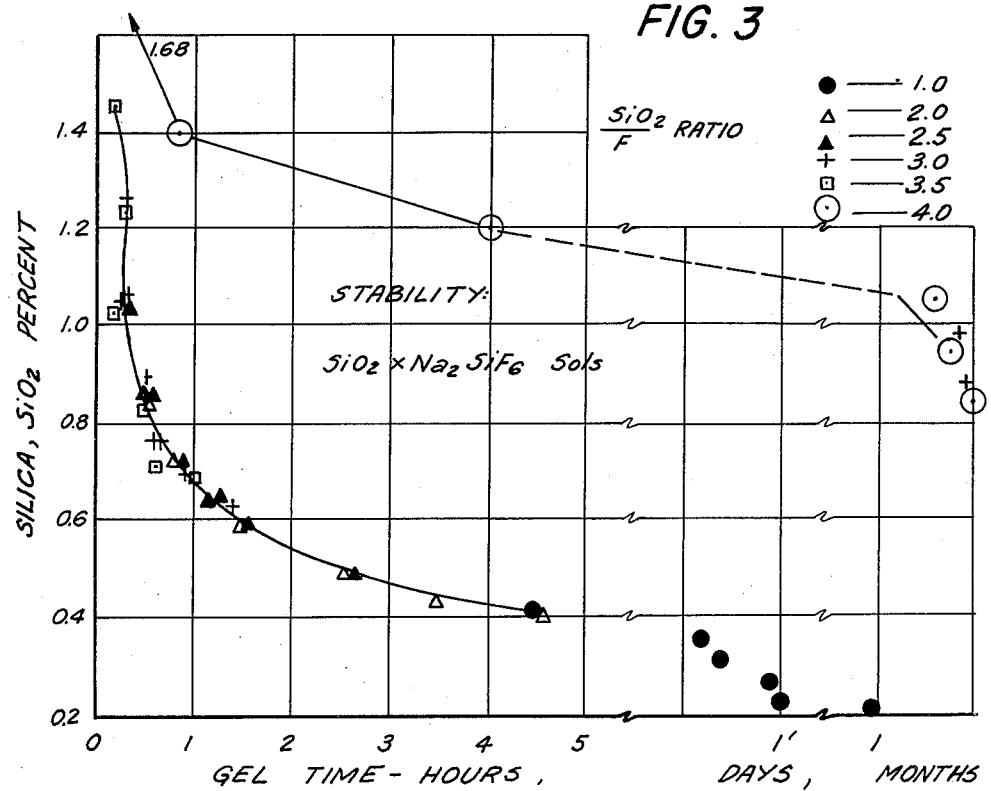
Figure 4:
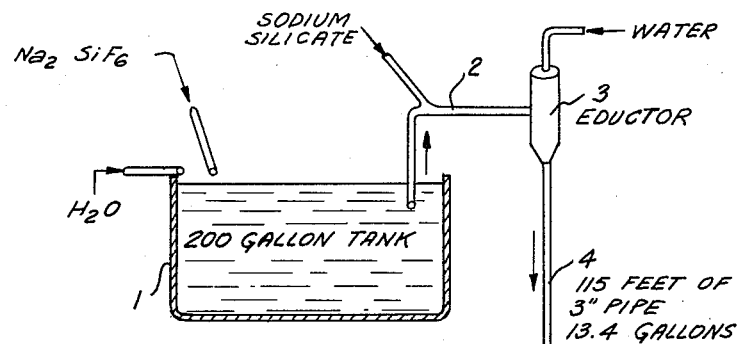
FIGURE 4 is a schematic view of an installation for carrying out the process according to the invention.
Figure 4:
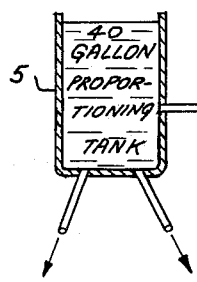

FIGURE 3 contains about the same data as FIGURE 2 but has been rearranged to show the effect of the $SiO_2$ concentration on the gel time in hours, days and months. The pH varied from 5.3 to 7.3 up to a ratio of 3 $SiO_2/F$. This pH was determined with a glass electrode. The sols at a ratio of 4 had a pH of 8.8 which accounts for the greatly prolonged gel time. The additional soluble silicate required to give this ratio raises the pH of the solution since the silicate is not completely neutralized.

The gel time of these solutions is considerably shorter than that of comparable sulfuric acid sols. Baylis (2,217,466) for instance, diluted his activated silica sol to 0.6% $SiO_2$ to prevent further gelation, while in these solutions using sodium silicofluoride as the neutralizing agent, gelation occurs at 0.6% $SiO_2$ in 1.5 hours. This rapidity of gelation, of course, presents another problem in the use of sodium silicofluoride in continuous processes. Such processes are more difficult to handle where the gel life is short. The danger of partial gelation and coating and clogging of the equipment is greatly enhanced, but activity develops almost at once. This is of considerable advantage in the reduction in size of equipment alone.

Table Ia below shows the results with activated silica formed from sodium silicofluoride by hydrolysis. There is a definite activity even without neutralization by NaOH Ia–1) neutralized with NaOH (Ia–2, 3).

Table Ib, below, part b, shows that active sols may be used in the $SiO_2/F$ ratio range of 2.5–5.0 and that in this range the pH varies from 6 to 10 while $SiO_2$ varies from 1.3 to 0.6%. The activity in use when the sol is added to the raw water is indicated by a decrease in turbidity after 10 minutes of settling. The preferred range is $SiO_2/F=2.5$ to 3.5 where the $SiO_2$ concentration is 0.6 to 1.3. The gel time ranged from 16 to 90 hours.

*Table I.—Estimation of Activity, Lime Softening pH 10*

Ia. $Na_2SiF_6$ Neutralized with NaOH

| | Sol. | | | | | Treated water | |
|---|---|---|---|---|---|---|---|
| | $Na_2SiF_6$ | NaOH | $SiO_2$ | Aged | | $SiO_2$, p.p.m. | Turbidity p.p.m. 10 min. settled |
| | | | | Min. | days | | |
| 1 | Saturated | None | 0.22 | | 41 | 2 | 71 |
| 2 | do | pH 8.3 | 0.17 | 10 | | 1 | 48, 44 |
| 3 | do | pH 8.3 | 0.17 | 60 | | 1 | 9.2 |

Ib. $Na_2SiF_6$ Neutralized With Soluble Alkali Silicates

| | Ratio $SiO_2/F$ | $SiO_2$, percent | pH | Gel time | Aged | | $SiO_2$, p.p.m. | Turbidity p.p.m. 10 min. settled |
|---|---|---|---|---|---|---|---|---|
| | | | | | Min. | Days | | |
| 1 | 2.0 | 0.42 | 5.6 | 4.5 hrs. | 10 | | 1 | 200 |
| | | | | | | | 3 | 200 |
| 2 | 2.5 | 0.66 | 6.0 | 90 | 15 | | 1.75 | 10 |
| 3 | 3.0 | 1.26 | 6.6 | 16 | 10 | | 2 | 3 |
| 4 | 4.0 | 0.73 | 8.6 | 15 days | 10 | | 5 | 150 |
| 5 | 4.0 | 0.73 | 8.6 | 15 | | 3 | 1 | 80 |
| | | | | | | 3 | 3 | 70 |
| 6 | 5.0 | 1.48 | 9.9 | | 10 | | 1 | 180 |
| | | | | | 10 | | 3 | 200 |
| 7 | 5.0 | 1.48 | 9.9 | | | 4 | 1 | 56 |
| | | 1.48 | 9.9 | | | 7 | 1 | 26 |

ADVANTAGES

I have found some surprising advantages result when using the process of this invention. First of all, of course, the process of this invention results in considerable economies of time, expense and apparatus because of the reduced number of separate treatment steps that are required. In other words, instead of having to separately add a coagulant aid solution to the water at one stage and a fluoridating solution to the water at another stage, it is only necessary to add one solution to the water.

More surprisingly, it was found that the silicofluoride is trifunctional. Besides the double action of the silicofluoride in providing a fluoride ion for fluoration and the neutralization of the sodium silicate to form an activated silica sol, the silicofluoride also provides extra $SiO_2$ to become activated and useful in coagulation. This amounts to 10 to 20% of that furnished by the addition of soluble sodium silicate, depending on the proportion of $SiO_2$ to fluoride used. That is, about 10 to 20% more active silica is produced by this process than by other processes. In fact, a 0.7% (nearly saturated) solution of $Na_2SiF_6$ was found to contain active silica after one hour, when neutralized by NaOH. Some activity was found in a similar solution, to which no NaOH had been added, after 41 days.

Furthermore, the gel time per unit concentration of silica is shortened substantially when sodium silicofluoride is used to activate the sodium silicate. This is quite unexpected and remains unexplained. While some disadvantage appears from this in the dangers of premature and partial gelation and a tendency to coat or clog equipment, the advantage is much greater. With the very short time required to develop activity, about two minutes, equipment is much smaller, compact, convenient and cheaper. Sodium silicate may be used in a continuous-type process without dilution.

The invention can be illustrated by the following specific example taken in conjunction with FIGURE IV, but it will be expressly understood that the invention is not limited thereto.

EXAMPLE I

Water and sodium silicofluoride were introduced into a 200 gallon tank 1 and mixed therein so as to maintain a 70 to 80% saturated aqueous solution of sodium silicofluoride, which was then drawn out through outlet pipe 2 into eductor 3. Outlet pipe 2 was about 12 inches long. Undiluted commercial "N Brand" sodium silicate (made by the Philadelphia Quartz Company and containing 8.9% $Na_2O$ and 28.7% $SiO_2$ and having a mol ratio of $Na_2O:3.3SiO_2$ with 1.395 specific gravity or a 41° Bé.) was added to the 70–80% saturated solution of sodium silicofluoride in outlet pipe 2 about 12 inches ahead of the eductor 3. The eductor water was held at a minimum. All activation took place in the 115 feet of three inch pipe 4 (about 13.4 gallons capacity) and the 40 gallon proportioning tank 5. The diluted sol was metered from the proportioning tank 5 into the water to be treated at a point immediately after the water was treated with lime for softening. Between 50 and 75 million gallons of water were treated in this manner each day. This test was carried out over a period of 50 days continuously. Feed amounted to 0.60–0.7 p.p.m. of F ion and 2 p.p.m. of activated $SiO_2$ in the treated water. This represents an $SiO_2/F$ ratio of 3.0–3.7. The pH varied from 5.8 to 8.5 and the $SiO_2$ concentration in the feed was 0.3–0.5%. Aging time was about two minutes. The results are shown in Table II.

*Table II.—Plant Scale Application, Results*

[All data related to treated water]

| Rate, MGD | Days after start | F⁻, p.p.m. | $SiO_2$, p.p.m. | $SiO_2/F$ | pH | Turbidity p.p.m., 10 min. settled floc. effluent | |
|---|---|---|---|---|---|---|---|
| | | | | | | No. 1 | No. 2 |
| 67.2 | 5 | 0.61 | 2.0 | 3.3 | 6.4 | 14 | 20 |
| 62.8 | 8 | 0.68 | 2.1 | 3.1 | 5.8 | 50 | 50 |
| 58.4 | 12 | 0.65 | 2.1 | 3.1 | 6.1 | 10 | 8 |
| 61.5 | 13 | 0.69 | 2.0 | 3.0 | 6.0 | 21 | 21 |
| 66.4 | 14 | 0.68 | 2.0 | 3.0 | 6.1 | 26 | 8 |
| 59.2 | 19 | 0.62 | 2.0 | 3.2 | 8.5 | 28 | 24 |
| 62.9 | 26 | 0.54 | 2.0 | 3.7 | 5.8 | 45 | 70 |

The rate MGD refers to million gallons per day of water through the plant. F⁻, p.p.m. shows the amount of fluoride ion added to the water, in parts per million and $SiO_2$ p.p.m. refers to the amount of $SiO_2$ added from the sodium silicate, so that the actual $SiO_2$ addition shown should be increased by "F⁻, p.p.m." ×0.526, or about 0.37. The pH is that of the prepared sol. No. 1 and No. 2 refer to the separate fluocculation basins. The water being treated was a well water. Lime was added to bring the pH up to about 10, leaving little unreacted $Ca(HCO_3)_2$ or excess lime present in the softening process. No other coagulant than silica was added. Return calcium carbonate sludge from the softening process was added before the lime and silica.

Several intentional changes were made in order to explore the effect of silica concentration in the sol preparation and of an increased silica feed to increase the silicafluoride ratio. The sludge feed was also changed. Variations in the procedure are summarized in Table III below wherein it is shown that $SiO_2$ in the sol used in the plant tests was varied from 0.2 to nearly 0.6%. With 0.7 p.p.m. of F ion the $SiO_2/F$ ratio could go as high as 4 (2.8 p.p.m. $SiO_2$) in a solution with a pH of 9. In Table IIIb it was found that sludge addition did not have much effect on the settling characteristics. 0.7 p.p.m. of F was used in these tests.

The test for coagulant effect was based on a measurement of the turbidity as fine calcium carbonate particles remaining after 10 minutes of settling. Samples were dipped from the flocculator effluent in a 2 liter beaker and allowed to sit undisturbed for 10 minutes. Portions were then taken from a point one inch above the bottom of the beaker using a one hundred ml. pipette having its tip bent upward so as not to disturb the settled matter. A sample was run into a short-form 100 ml. Nessler tube and tested with a "Lumetron 450" photo-electric colorimeter using the "B-630" red filter. Values below 40 are good while those between 10–20 are considered excellent.

There was no evident loss of fluoride ion. The raw water contained 0.2 p.p.m. of F ion and 230 p.p.m. of alkalinity with 8 p.p.m. of magnesium hardness and 25 p.p.m. of non-carbonated hardness.

It was found that the silica feed control was not critical and that there was no tendency to plug the filters. In 40 days there was no difficulty with build-up in the sol feed lines.

*Table III.—Changes* a. $SiO_2$ Concentration in Prepared Sol.
b. Same, Plus Sludge Feed

Flocculator effluent samples a. Plant Operation (From Table II)

| $SiO_2$, percent | Turbidity, p.p.m. | |
|---|---|---|
| | No. 1 South | No. 2 North |
| None | 90–150 | 80–125 |
| 0.5 maximum | 10– 30 | 8– 35 |
| 0.4 normal | 15– 50 | 16– 55 |
| 0.3 minimum | 23– 45 | 30– 70 | b. Experimental, During Plant Operation (All Sludge to No. 1 Mixing Tank)

| | $SiO_2/F$ | $SiO_2$, percent | Turbidity, p.p.m. | |
|---|---|---|---|---|
| | | | No. 1 South | No. 2 North |
| 1 | 2.5 | 0.32 | 10– 25 | 4–10 |
| 2 | 2.5 | 0.56 | 7– 15 | 4– 6 |
| 3 | | None | 60–100 | 40–60 |
| 4 | 2.9 | 0.34 | 25– 35 | 12–14 |
| 5 | 2.9 | 0.20 | 60– 80 | 15–25 |
| 6 | 4.0 | ¹ 0.42 | 6– 11 | 3– 8 |

¹ pH=8.9.

Those skilled in the chemical and water treatment arts will recognize that whereas this invention has been described with particular reference to certain specific chemicals, other and different compounds might be used instead. For example, instead of using sodium silicofluoride one might use the highly soluble hydrofluosilicic acid providing more than 3% fluoride in solution, in which case the optimum silica to fluoride ratio might range between about 4.3 and 5.8. Also, instead of using sodium silicate one might use other alkali silicates such as potassium silicate. It will also be appreciated that whereas this invention has been described with particular reference to potable waters, it is of course applicable to the treatment of process waters, waste waters, sediment carrying water, etc.

What is claimed is:

A process for the treatment of raw water which comprises introducing an activated silica sol containing fluoride ions into the raw water by contacting a solution of sodium silico-fluoride with sodium silicate having a $Na_2O:SiO_2$ ratio of between 2:1 and 1:4 while permitting a reaction time ranging from 1 minute up to 90% of the gel time of the reaction mixture and thereafter introducing the reaction mixture into the raw water in an amount sufficient to produce floc formation and fluoridation of the raw water.

References Cited in the file of this patent

UNITED STATES PATENTS

| | | |
|---|---|---|
| 1,016,928 | Bishop | Feb. 13, 1912 |
| 2,028,397 | Kliefoth | Jan. 21, 1936 |
| 2,444,774 | Hay | July 6, 1948 |
| 2,643,226 | White | June 23, 1953 |
| 2,823,097 | Mockrin | Feb. 11, 1958 |
| 2,840,456 | Gooding | June 24, 1958 |

OTHER REFERENCES

Black: "Water and Sewage Works," Reference and Data, pages R–129 to R–132 relied upon, vol. 101, No. 5, May 1954.

Phila. Quartz Co., "Water and Sewage Works," Reference and Data, page R–94 relied upon, June 15, 1956.

Partington: "Textbook of Inorganic Chemistry," Macmillan & Co., London, England, 6th ed., pages 668 and 694.

Journal of American Water Works Association, page 1104, vol. 51 (September 1959); pages 744–762, vol. 43 (September 1951); pages 893–908, vol. 45 (August 1953).